No. 877,791. PATENTED JAN. 28, 1908.
E. MOULIÉ.
POLLEN COLLECTING DEVICE.
APPLICATION FILED MAY 13, 1907.
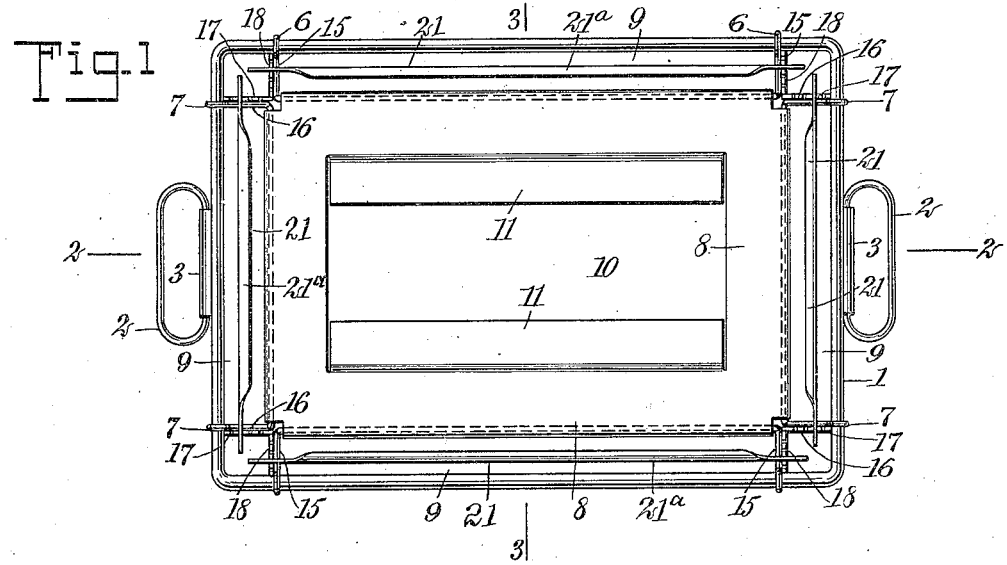
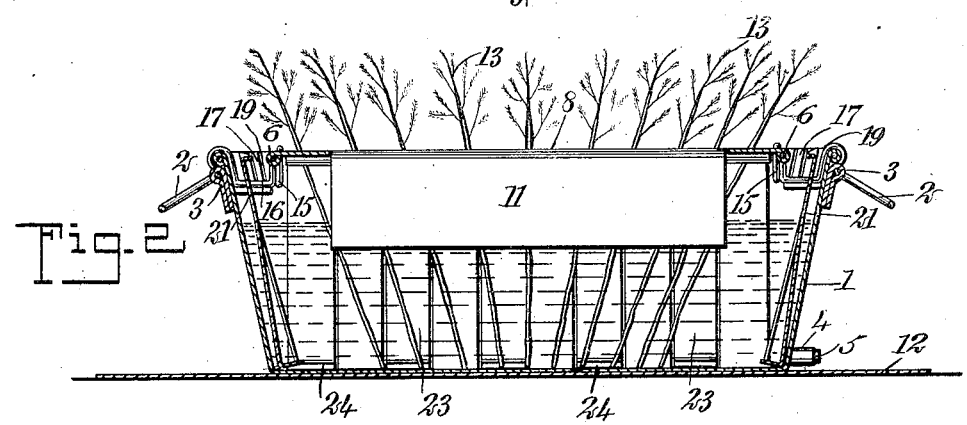
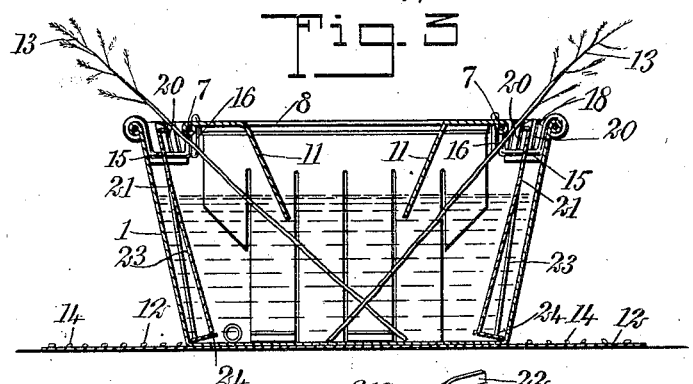
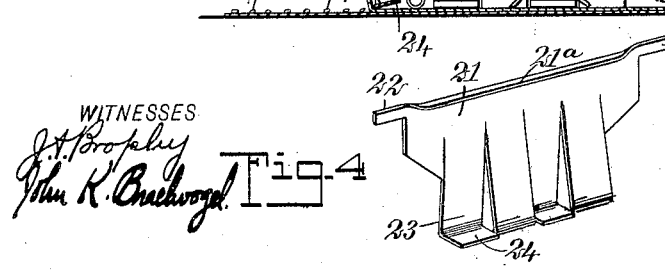
WITNESSES
INVENTOR
Eugène Moulié
BY
ATTORNEYS

UNITED STATES PATENT OFFICE.

EUGÉNE MOULIÉ, OF JACKSONVILLE, FLORIDA.

POLLEN-COLLECTING DEVICE.

No. 877,791.         Specification of Letters Patent.         Patented Jan. 28, 1908.

Application filed May 13, 1907. Serial No. 373,326.

*To all whom it may concern:*

Be it known that I, EUGÉNE MOULIÉ, a citizen of the United States, and a resident of Jacksonville, in the county of Duval and State of Florida, have invented a new and Improved Pollen-Collecting Device, of which the following is a full, clear, and exact description.

This invention relates to pollen collecting devices and embodies an improvement over the construction of the device shown in Letters Patent No. 834,746 issued to me October 30, 1906.

The object of the invention is to provide a simple, strong and durable device, by means of which pollen from flowers or other blossoms can be collected for use in the manufacture of perfumes, medicines and the like, and in flower and plant breeding, and in which the flowers, twigs or branches bearing blossoms from which the pollen is to be collected are held with their stems immersed in water or other liquid contained in a vessel.

A further object of the invention is to provide a pollen collecting device which may be easily moved about from place to place, in which the twigs or branches are retained comparatively secure against accidental displacement, and which is adjustable to receive flowers having stems of different thicknesses.

The invention consists in the construction and combination of parts to be more fully described hereinafter, and particularly pointed out in the claims.

Reference is to be had to the accompanying drawings forming a part of this specification, in which similar characters of reference indicate corresponding parts in all the figures.

Figure 1 is a plan view of the device; Fig. 2 is a longitudinal section on the line 2—2 of Fig. 1; Fig. 3 is a transverse section on the line 3—3 of Fig. 1; and Fig. 4 is a perspective view of a detail.

Referring more particularly to the drawings, I provide a vessel or tank 1, which may be of any suitable shape, but is preferably rectangular in form as shown in Figs. 1 and 2. The vessel may be made of sheet metal or other suitable material, and is provided at the ends with handles 2, loosely mounted in sockets 3 rigidly secured to the sides. By means of these handles the device may be easily moved from place to place as circumstances require. Near the bottom of the vessel and on one of the sides, I provide a small tube 4 communicating with the interior, by means of which the vessel may be emptied of the water or other fluid within it when so desired by simply allowing the water to flow out through the tube, or through a hose attached to the tube. The tube may be closed ordinarily by inserting a cork or plug 5 in the end thereof. It will be understood that if so desired, this tube 4 may be replaced by a faucet or turn-cock.

Across the open top of the vessel, I provide a pair of transverse bars 6 and a pair of longitudinal bars 7 crossing the transverse bars 6 at substantially right angles. The bars are secured to the edges of the vessel by having their extremities bent over these edges and soldered or otherwise rigidly attached thereto. The bars are located across the top of the vessel parallel respectively to the sides and longitudinal edges, and at a slight distance from the same, as shown most clearly in Fig. 1. Mounted upon the cross bars is a top 8 of sheet metal or other suitable material, the edges of which are bent around the bars and soldered or otherwise suitably secured thereto. The top 8 does not extend to the edges of the vessel 1, but leaves lateral openings 9 between these edges and the top. The top is provided with an opening 10, substantially in the center, which may be of any suitable form but is preferably rectangular as is shown most clearly in Fig. 1. This opening is formed by making two substantially parallel transverse cuts in the sheet metal comprising the top and a longitudinal cut joining the two transverse cuts. The flaps 11 of the metal thus separated on the sides are then bent downward as appears in Fig. 1.

The transverse bars 6 and the longitudinal bars 7 have laterally disposed offset parts 15 and 16 respectively, adjacent to the sides of the vessel. The offset parts 15 and 16 are downwardly disposed and constitute bends within which are secured plates 17 and 18 by soldering or in any other suitable manner. Each plate has a plurality of slots 20 and these are substantially parallel to the sides of the vessel. Adjusting members 21 having extensions 22 at the ends are arranged in the openings 9 between the sides of the vessel and the top 8, the ends 22 of the adjusting members being removably mounted in opposite slots of the plates 17 and 18. The upper edge of the member 21 is laterally disposed to form a flange 21ª and the body of the member 21 is formed into strips 23. The adjacent strips are disposed laterally in opposite directions and have laterally disposed toes 24 extending in opposite directions as is shown most clearly in Fig. 4. The office of the toes is to maintain the adjusting members a certain distance from the sides of the vessel when these are in position in the openings 9. It will be understood that by means of the adjusting members the openings can be adjusted for twigs or branches of different sizes, the stems being arranged between the edges of the cover and the edges presented by the flanges 21$^a$ of the adjusting members. When it is desired to use this device for collecting the pollen from plants, twigs or branches 13 of these plants are severed and are then inserted through the lateral openings 9 with their stems extending into the vessel in a diagonally downward direction, as is shown most clearly in Fig. 1, said stems being immersed in the liquid, preferably water, with which the vessel is filled. The device is placed upon a sheet of paper 12 or other material, and is located in a closed room in which the temperature is maintained constantly at a suitable point and from which drafts are excluded which would be liable to disturb the pollen or blow it away. As the ends of the twigs or branches project beyond the sides of the vessel and extend over the paper upon which the device is placed, the pollen 14 as it separates from the blossoms will fall upon this paper from which it is easily collected from time to time. As the stems of the twigs are immersed in water, the blossoms will remain fresh and will gradually ripen under the favorable circumstances of moisture and constant proper temperature.

The downwardly-projecting flaps 11 are useful in holding the twigs 15 submerged and preventing their accidental displacement. It is of advantage to change the water or other liquid in the vessel from time to time, and this may be done without disturbing the plants by withdrawing the liquid through the tube 4 and replacing it with fresh liquid by filling the vessel through the opening 10, and thus in no way disturbing the twigs or branches.

Having thus described my invention, I claim as new and desire to secure by Letters Patent:

1. A device of the class described, comprising a vessel having adjustable means for holding a plurality of twigs and the like in an inclined position with the stems immersed in a liquid in said vessel and with the ends projecting over the edges of said vessel.

2. A device of the class described, comprising a vessel adapted to contain a liquid, and having adjustable means for holding a plurality of twigs and the like near the edges of said vessel in an inclined position with the stems immersed in a liquid, and a top having an opening whereby the vessel may be filled with liquid.

3. A device of the class described, comprising a vessel adapted to contain a liquid, a top on said vessel, said top and said vessel presenting openings therebetween adapted to allow the insertion of twigs and the like, and adjusting means removably located in said openings.

4. A device of the class described, comprising a vessel adapted to contain a liquid, a top extending toward the sides of said vessel and having cross bars adapted to engage with the edges of said vessel to hold said top in place, said top and said vessel presenting openings therebetween, and removable adjusting means carried by said bars and arranged in said openings.

5. A device of the class described, comprising a vessel adapted to contain a liquid, cross bars secured to the edges of said vessel and extending across the same, a top mounted on said cross bars, said top and said vessel presenting openings therebetween, and adjusting members in said openings, said adjusting members having lateral flanges near the upper edges and presenting toes adapted to engage the sides of said vessel.

6. A device of the class described, comprising a vessel adapted to contain a liquid, cross bars secured to the edges of said vessel and extending across the same, a top mounted on said cross bars, said top and said vessel presenting openings therebetween, said cross bars having offsets near the walls of said vessel, members mounted at said offsets and presenting slots, and adjusting members arranged in said openings and having extensions removably located in said slots, said adjusting members having lateral flanges near the upper edges of the same, and having strips, said strips presenting laterally disposed toes adapted to engage the walls of said vessel.

7. In a device of the class described, an adjusting member adapted to be arranged in a vessel for containing a liquid and having extensions for mounting the same, a laterally disposed flange at the upper edge between said extensions, and downwardly disposed strips each inclined with respect to the adjacent strip and having a laterally disposed toe, the toes of adjacent strips being disposed in opposite directions and serving to engage the walls of said vessel to offset said member therefrom.

In testimony whereof I have signed my name to this specification in the presence of two subscribing witnesses.

EUGÉNE MOULIÉ.

Witnesses:
   FRED. T. BARNETT,
   RAYMOND D. CREIGLER, Jr.